United States Patent [19]
Marx

[11] 3,888,236
[45] June 10, 1975

[54] APPARATUS FOR MEASURING A QUANITY OF URINE

[76] Inventor: Günter Marx, Engadiner Str. 4, 8 Munich 71, Germany

[22] Filed: Mar. 28, 1973

[21] Appl. No.: 345,767

[30] Foreign Application Priority Data
Mar. 28, 1972 Germany.................... 7211842[U]

[52] U.S. Cl.................. 128/2 F; 73/427; 128/295
[51] Int. Cl............................ A61b 5/10; A61f 5/44
[58] Field of Search........... 128/2 F, 272, 275, 295, 128/214 D, DIG. 24; 73/194, 219, 426; 4/110; 150/.5, 1; 229/53

[56] References Cited
UNITED STATES PATENTS

| | | | |
|---|---|---|---|
| 2,648,335 | 8/1953 | Chambers | 128/295 |
| 2,799,314 | 7/1957 | Dreyer et al. | 150/.5 |
| 2,848,995 | 8/1958 | Ryan | 128/214 D |
| 2,936,757 | 5/1960 | Trace | 128/DIG. 24 |
| 2,937,645 | 5/1960 | Sachs | 128/DIG. 24 |
| 3,001,397 | 9/1961 | Leonard | 73/219 X |
| 3,189,252 | 6/1965 | Miller | 128/DIG. 24 |
| 3,368,561 | 2/1968 | Ericson et al. | 128/275 |
| 3,545,671 | 12/1970 | Ross | 128/214 D |
| 3,661,143 | 5/1972 | Henkin | 128/2 F |
| 3,724,461 | 4/1973 | Eisenberg | 128/295 |
| 3,831,453 | 8/1974 | McWhorter | 128/2 F X |

FOREIGN PATENTS OR APPLICATIONS
365,707  12/1938  Italy.................... 128/295

Primary Examiner—Richard A. Gaudet
Assistant Examiner—J. C. McGowan
Attorney, Agent, or Firm—Fleit & Jacobson

[57] ABSTRACT

The appliance comprises a conical measuring vessel and serves to measure the quantity of urine which has been excreted in a unit of time. The conical measuring vessel is inverted and is formed by a bag of transparent material and is integral with a collecting bag, which consists of plastics material and is disposed under an outlet which is disposed at the apex of the cone and adapted to be closed.

13 Claims, 2 Drawing Figures

Fig. 1

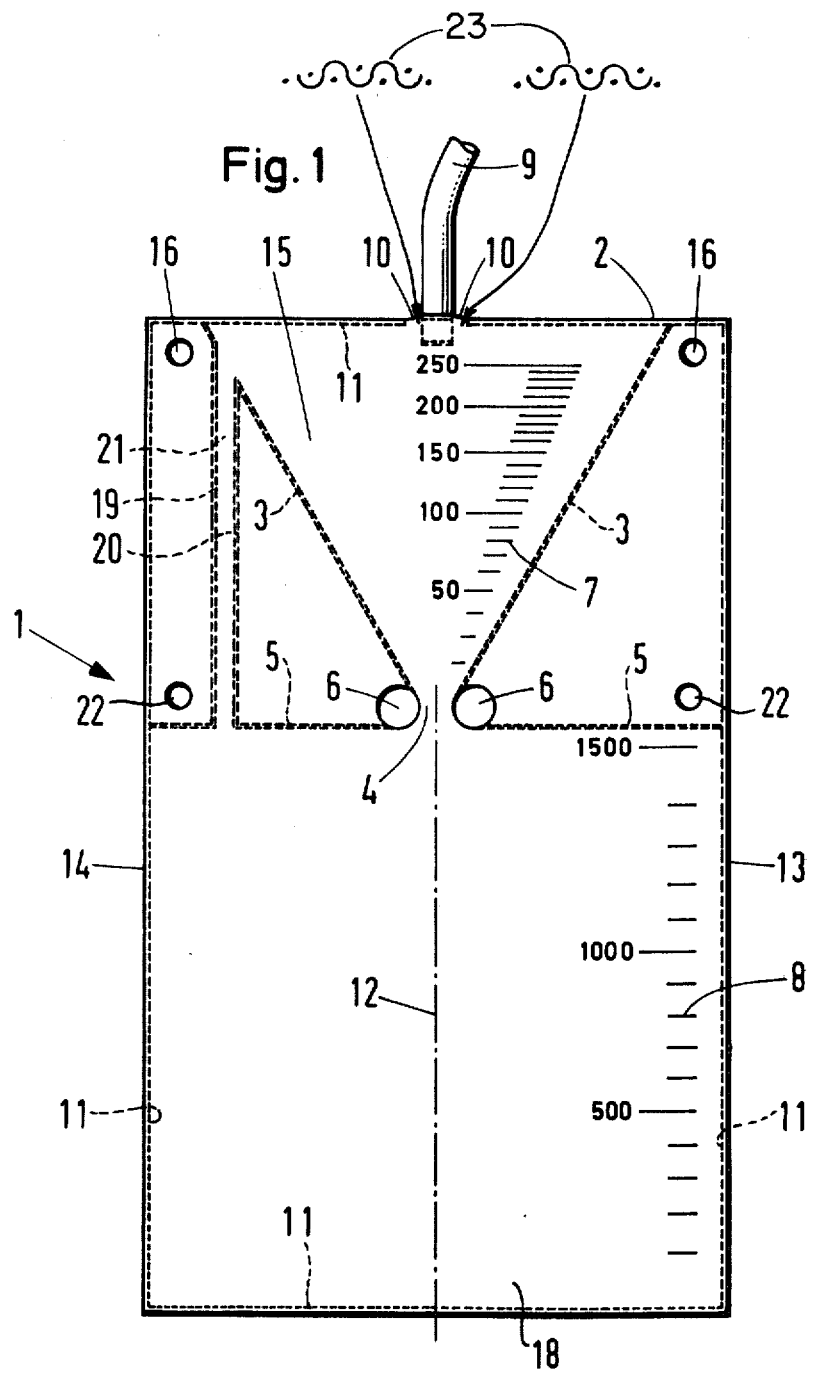

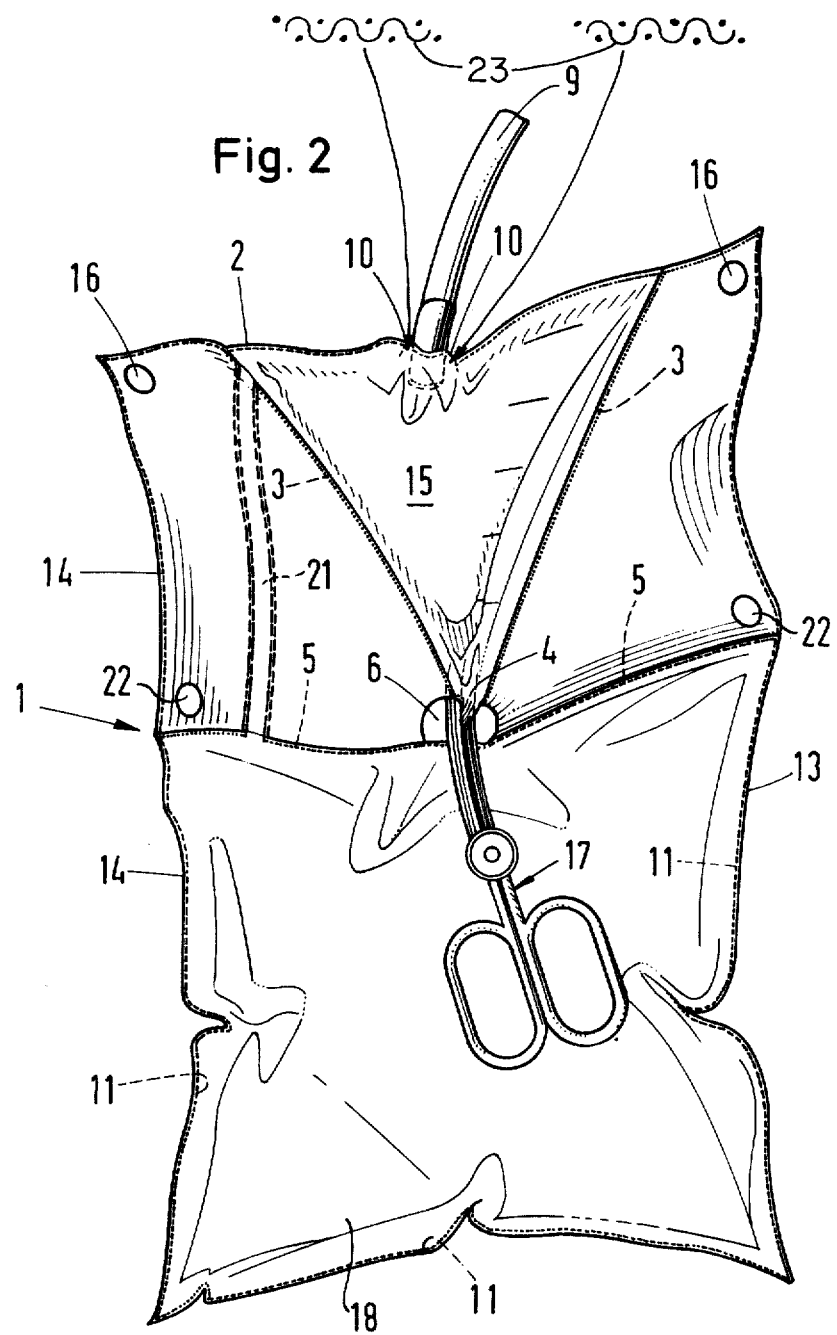

APPARATUS FOR MEASURING A QUANITY OF URINE

This invention relates to an appliance which comprises a conical measuring vessel and serves to measure the quantity of urine which has been excreted in a unit of time.

In connection with diseases of the urine-excreting organs, particularly of the kidneys, it is highly important to the physician to know the quantity of urine which has been excreted in a unit of time. The quantity of urine can be measured by the physician with the aid of so-called urometers, in which the quantity of urine is measured which has been collected therein in a predetermined unit of time.

Known volumetric measuring appliances (urometers) comprise cylindrical or conical measuring vessels, which are rigid and to which urine-collecting bags, which are also known, can be connected by a plug valve and a connecting pipe. Because the known urometers consist of two parts, their operation is fairly complicated.

It is an object of the invention to provide for the measurement of the quantity of urine which has been excreted in a unit of time an appliance which can easily be applied and which requires no maintenance.

In an appliance of the kind defined first hereinbefore, this object is accomplished according to the invention in that the conical measuring vessel is inverted and is formed by a bag of transparent plastics material and is integral with a collecting bag, which consists of plastics material and is disposed under an outlet, which is disposed at the apex of the cone and adapted to be closed. The measuring appliance according to the invention can be shipped and stored within a small space so that it can easily be kept on stock. The appliance can be manufactured at low cost so that the appliance can be used with high economy and can be discarded after a single use. There is no need to clean the appliance; this is desirable in view of the shortage of labor.

The conical measuring vessel and the collecting bag disposed below said vessel are preferably made from two layers which consist of flat plastics material sheeting and are joined by seam welds or weld seams. The appliance may be made in a simple and inexpensive manner in that two rectangular layers of plastics material sheeting are joined by a seam weld, which extends around the periphery of the panel except for an inlet opening in the base of the conical measuring bag, and in that seam welds are provided which are symmetric to the center line of the bag and extend obliquely from the side portions of the upper edge to a point short of said center line and then back to the side edges of the bag so as to leave an opening at the apex of the cone, whereby the measuring bag is defined and is separated from the collecting bag.

The two sheeting layers may be formed with through apertures which are disposed beside the opening at the apex of the conical measuring bag and through which a clip can be inserted to pinch off the opening. Alternatively a valve which can be operated from the outside may be provided in the conical measuring vessel at the apex thereof. Because surgical clips are available in a hospital, they may be used to close the bag in a simple manner.

The base of the measuring cone coincides with the top edge of the bag, and an inlet hose is suitably welded in said base so as to leave laterally disposed gaps through which air can enter the conical measuring bag.

The air inlet opening is suitably covered by a sterile filter for admitting air.

In a development of the invention, the top portion of the measuring vessel is connected by a conduit to the collecting bag. When it has been inadvertently omitted to empty the upper measuring vessel, the presence of such overflow conduit will avoid an undesired escape of urine from the air inlet openings which are covered by the filters.

The overflow conduit can be provided with a simple manner by the formation of two parrallel seam welds.

The conical measuring bag and, if desired, also the collecting bag are provided with graduations from which the contents of the bag can be read. When the predetermined measuring time has expired and the measurement has been read from the graduated upper bag, the clip which closes the cone at its apex is opened so that the collected liquid enters the lower bag. The bag is suitably provided at its top end with two hangers by which it can be suspended in a simple manner from the bed of the patient.

To prevent a flattening of the conical measuring bag under the action of the weight of the filled collecting bag, it is desirable to provide the collecting bag at its top edge with additional fixing means. In this case the appliance may be secured to a stand at the upper end of the conical measuring bag and at the upper end of the lower collecting bag in such a manner that the measuring bag is not influenced by the contents of the collecting bag. The forces exerted by the contents of the collecting bag in a horizontal and vertical direction are taken up by the fixing means provided at the top edge of the collecting bag and cannot have a disturbing effect. Because the measuring bag could be deformed also as a result of a sagging or twisting of the inlet hose, the latter is suitably fixed to the stand which carries the appliance. For this purpose, a spring clip may be provided into which the hose can be forced.

An embodiment of the invention will now be described more fully with reference to the drawing, in which FIG. 1 is a top plan view showing a flattened measuring bag and the collecting bag and FIG. 2 is a perspective view showing the bag in a condition in which the conical measuring bag is partly filled.

The flattened bag 1 shown in FIG. 1 consists of two flat rectangular layers of plastics material sheeting, which are joined by peripheral seam welds 11 and seam welds 3 and 5. The seams welds 3 which define the conical measuring vessel are symmetric to the center line 12 of the bag and extend from the side portions of the top edge 2 toward the center line 12 to form an inverted isosceles triangle. The seam welds 3 terminate short of the center line 12 of the bag and are continued by seam welds 5, which are parallel to the top edge 2 of the bag and extend to the sides 13 and 14 of the latter so that a non-welded passage 4 is left at the apex of the triangle 15. Apertures 6 are punched through the two sheeting layers laterally of the passage 4 which forms the outlet opening, and surgical clips can be inserted through said apertures 6 to close the outlet opening. In the base of the triangle 15, a hose 9 of plastics material is welded in the upper edge 2 of the bag. The peripheral seam welds 11 terminate short of the hose 9 of plastics material so that gaps 10 are left through which air can enter the conical measuring vessel and which is covered by a sterile filter 23 for admitting air.

Two holes 16 are punched into the top edge portion of the bag, and straps for fixing the bag to the bed of the patient may extend through these holes.

The conical measuring vessel and the collecting bag below the same are provided with scales 7, 8 from which the quantity of collected liquid can be read.

It is shown in FIG. 2 how the measuring vessel assumes a conical shape when the opening 4 has been closed with a clip 17 and liquid has been collected.

An overflow conduit 21 may be provided in a simple manner between the upper portion of the measuring vessel 15 and the collecting bag 18. This is indicated in dotted lines in FIG. 1. The overflow conduit is formed by the two parallel seam welds 19 and 20. The seam welds 3 and 5 must be interrupted at the inlet and outlet, respectively, of the overflow conduit.

To match the width of conventional bags for collecting urine, the width of the flattened bag between the two holes 16 is suitably 155 millimeters.

Additional fixing holes 22 are provided above the seam weld 5 which define the collecting bag 18 and may be used to fix the appliance to a stand. The associated stand is suitably provided with four pins, which extend into the fixing holes 16 and 22 so that the measuring bag 15 and the collecting bag 18 are fixed in position and a distortion of the measuring bag by the collecting bag is prevented. The inlet hose 9 is also fixed in a clip on a stand, not shown, so that the measuring bag cannot be deformed by the hose 9 when the same sags or is twisted.

What is claimed is:

1. A urine measuring and collecting container comprising two flat plastic sheets joined together by first weld seams to form said container, said container being divided into an upper measuring chamber and a lower collecting chamber by second weld seams joining said sheets together, said measuring chamber having the shape of an inverted cone defined by said second weld seams with the base positioned at the top of said container and the apex positioned above said collecting chamber, said measuring chamber having an opening in said base for receiving urine, said measuring chamber having indicia associated therewith for measuring the quantity of urine receive therein in a unit of time, the apex of said cone forming an outlet for transferring urine from said measuring chamber to said collecting chamber, and means associated with said outlet for enabling said outlet to be selectively closed.

2. A urine measuring and collecting container comprising two flat plastic sheets joined together by first weld seams extending around the periphery of said sheets to form said container, said container being divided into an upper measuring chamber and a lower collecting chamber by second weld seams joining said sheets together, said measuring chamber having the shape of an inverted cone with the base positioned at the top of said container and the apex positioned above said collecting chamber, said second weld seams extending obliquely from the side portions of the top of said container to a point near the longitudinal center line of said container thereby forming the apex of said inverted cone, said measuring chamber having an opening in said base for receiving urine, said measuring chamber having indicia associated therewith for measuring the quantity of urine received therein in a unit of time, the apex of said cone forming an outlet for tranferring urine from said measuring chamber to said collecting chamber, and means associated with said outlet for enabling said outlet to be selectively closed.

3. The container of claim 2 in which said two flat plastic sheets are rectangular, said second weld seams extending obliquely from said side portions are symmetrical with respect to the longitudinal center line of said container, and wherein third weld seams extending from the apex of said inverted cone to the sides of said container thereby further separating said measuring chamber from said collecting chamber.

4. The container of claim 2 in which said means associated with said outlet for enabling said outlet to be selectively closed comprises an opening formed on each side of the apex of said inverted cone through which a means can be inserted to pinch off said outlet.

5. The container of claim 2 in which said means associated with said outlet for enabling said outlet to be selectively closed comprises a valve which can be operated from outside said container and which is associated with said outlet.

6. The container of claim 2 in which said base in said inverted cone includes air inlet means.

7. The container of claim 6 in which said air inlet means includes a sterile filter for filtering air admitted into said measuring chamber.

8. The container of claim 2 in which said collecting chamber includes indicia associated therewith for measuring the quantity of urine collected therein.

9. The container of claim 2 in which said container includes means formed at the top of said container for fixing said container to a support.

10. A urine measuring and collecting container comprising two flat plastic sheets joined together to form an upper measuring chamber and a lower collecting chamber, said measuring chamber having the shape of an inverted cone with the base positioned at the top of said container and the apex positioned above said collecting chamber, said measuring chamber having an opening for receiving urine, said measuring chamber having indicia associated therewith for measuring the quantity of urine received therein in a unit of time, the apex of said cone forming an outlet for transferring urine from said measuring chamber to said collecting chamber, and means associated with said outlet for enabling said outlet to be selectively closed comprising an opening formed on each side of the apex of said inverted cone through which a means can be inserted to pinch off said outlet.

11. A urine measuring and collecting container comprising two flat plastic sheets joined together to form an upper measuring chamber and a lower collecting chamber, said measuring chamber having the shape of an inverted cone with the base positioned at the top of said container and the apex positioned above said collecting chamber, said measuring chamber having an opening for receiving urine, said measuring chamber having indicia associated therewith for measuring the quantity of urine received therein in a unit of time, said measuring chamber and said collecting chamber being connected by an over-flow conduit formed between said two flat plastic sheets, the apex of said cone forming an outlet for transferring urine from said measuring chamber to said collecting chamber, and means associated with said outlet for enabling said outlet to be selectively closed.

12. The container of claim 11 in which said overflow conduit is defined by at least two seam welds.

13. The container of claim 11 in which said container includes means formed at the top of said collection chamber for fixing said container to a support.

* * * * *